Patented Nov. 10, 1942

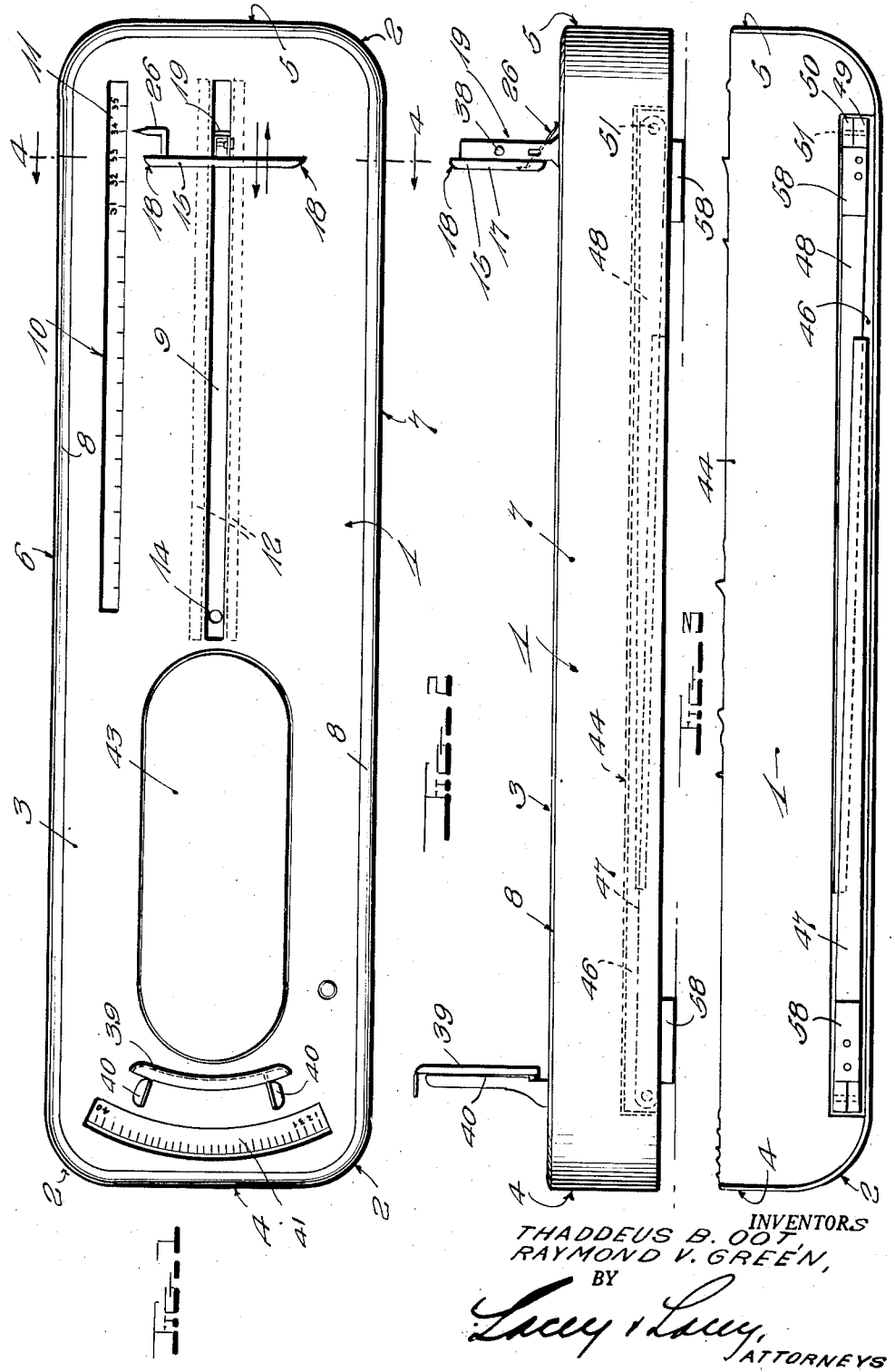

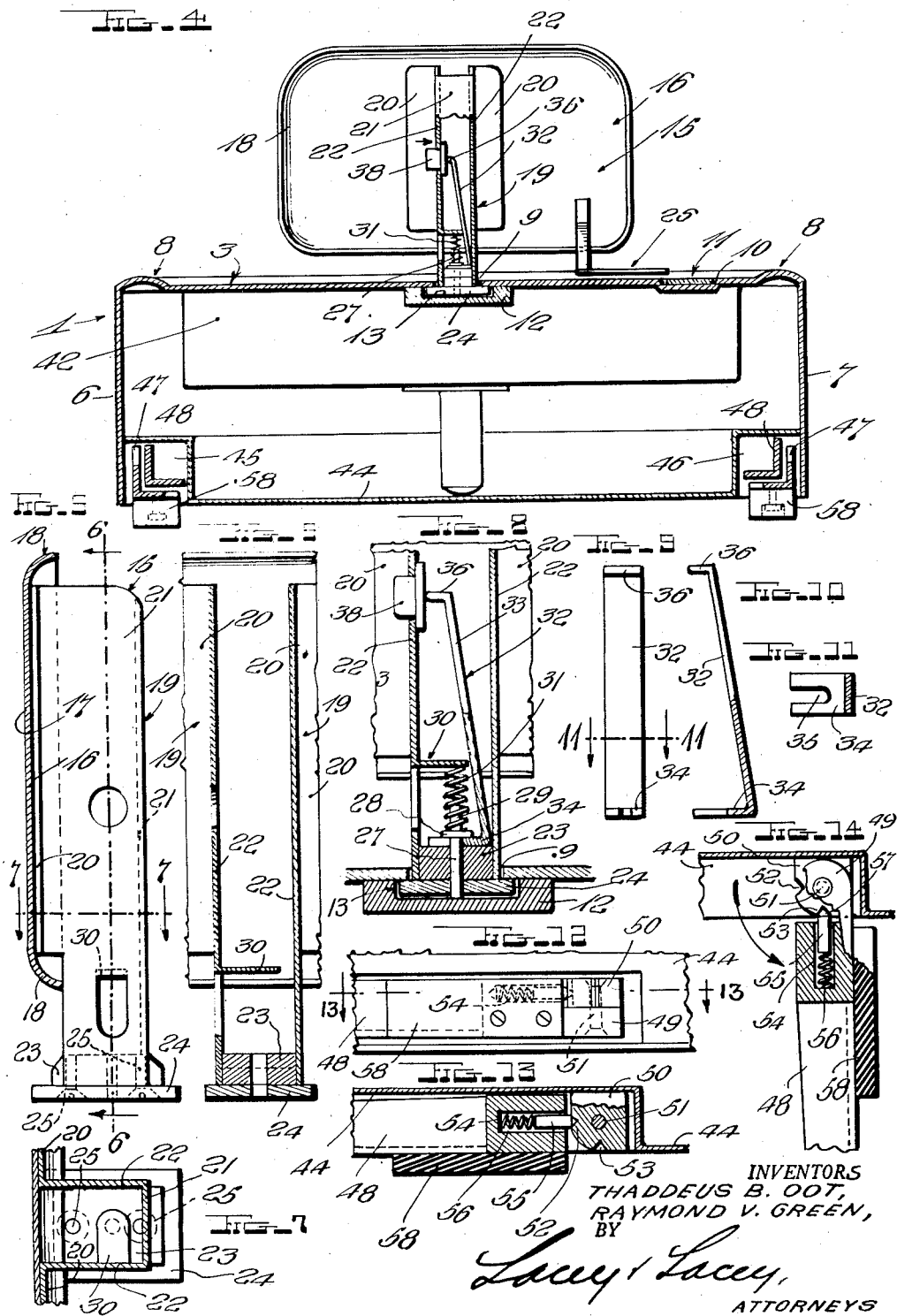

2,301,574

UNITED STATES PATENT OFFICE 2,301,574

MEASURING TABLE

Thaddeus B. Oot, Syracuse, and Raymond V. Green, Fulton, N. Y.

Application May 19, 1941, Serial No. 394,194

4 Claims. (Cl. 33—143)

This invention relates generally to tables and more particularly to an improved combined scale and measuring table.

One object of the invention is to provide a combination scale and measuring table which will enable a physician, nurse or other person to measure the length, or height, of a baby and at the same time ascertain the weight of said child.

Another object of the invention is to provide a device of this character having supporting legs, which legs are collapsible and may be lengthened or shortened as desired.

A further object of the invention is to provide a combination scale and measuring table by the use of which it will be possible for a physician or other person to measure and weigh a child with maximum speed and facility.

A still further object of the invention is to provide a combination scale and measuring table which is light in weight and of relatively small size so that it may be quickly transported from place to place.

Still another object of the invention is to provide a scale and table of the character mentioned wherein means is employed for bracing the foot plate so that accuracy will be assured when measurements are being taken.

And still another object of the invention is to provide a combination scale and measuring table which is characterized by the utmost simplicity of construction and which will be highly efficient in use.

Further objects of the invention not specifically mentioned hereinbefore will become apparent during the course of the following description.

In the drawings forming a part of our application:

Figure 1 is a top plan view of our improved combination scale and measuring table, Figure 2 is a side elevation of the invention, the legs employed being shown in dotted lines as they would appear in folded position, Figure 3 is a detail bottom elevation showing a pair of the legs in folded position, Figure 4 is an enlarged transverse sectional view on the line 4—4 of Figure 1 looking in the direction indicated by the arrows, Figure 5 is a still further enlarged side elevation of the foot plate employed, the view being partly in section, Figure 6 is a detail sectional view on the line 6—6 of Figure 5, Figure 7 is a detail horizontal sectional view on the line 7—7 of Figure 5, Figure 8 is an enlarged detail sectional view showing particularly the clamping mechanism employed for clamping the foot plate in position, Figure 9 is a front view of the clamping lever employed with the clamping mechanism, Figure 10 is a side elevation, partly in section, of said clamping lever, Figure 11 is a detail sectional view on the line 11—11 of Figure 9, Figure 12 is an enlarged detail top plan view showing the leg mounting structure, Figure 13 is a detail sectional view on the line 13—13 of Figure 12, and Figure 14 is a detail sectional view, partly in elevation, showing a portion of the leg mounting structure with one of the legs extended.

Referring now more particularly to the drawings, it will be seen that like numerals of reference designate like parts throughout the views.

Referring first to Figures 1 and 2 of the drawings, the numeral 1 indicates in general the frame or body of our invention. The body 1 is preferably formed of pressed, light weight sheet metal and is, as best seen in Figure 4, substantially inverted U shape in cross section. The body 1 is of oblong rectangular shape in top plan and has rounded corners 2. The body 1 is formed with a top wall 3, end walls 4 and 5 and side walls 6 and 7. As best seen in Figure 4, the top wall 3 is slightly recessed to define a bead 8 which extends throughout the perimeter of the body. It should be understood that the top and side walls of the body may be painted and otherwise decorated as desired.

Formed in the top wall 3 and extending throughout substantially one-half the length of the body, medially of the width thereof, is a slot 9, the purpose of which will be set forth in more detail hereinafter. Also formed in the top wall 3 in parallel spaced relation to the slot 9 is a recess 10, and mounted in the recess 10 is a scale 11 which is preferably graduated in inches. As will be seen, the scale is disposed near the side wall 6 of the body and in the same horizontal plane with the slot 9. Mounted beneath the slot 9 and extending throughout the length of said slot is a guide channel 12, said guide channel having a guide slot 13 therein. Formed in the inner end of the channel 12 is an opening 14, the purpose of which will be mentioned hereinafter.

Slidably mounted on the top wall 1 of the body 3 and in the slot 9 is a foot plate which is indicated generally by the numeral 15. The foot plate 15 is best seen in Figures 4, 5, 6, 7 and 8 of the drawings. By referring to these figures, it will be seen that the foot plate includes a plate element 16 which is formed of pressed metal and has a flat outer surface 17 and a rounded edge 18. The foot plate also includes a mounting bracket which is shown generally at 19. The bracket 19 is formed of pressed metal and includes mounting flanges 20. The bracket 19, as best seen in Figure 7, is substantially U-shape in contour and includes a rear wall or bight portion 21 and side walls 22. Also, the bracket 19 is closed at its lower end by a bottom wall 23.

In order to mount the foot plate in the slot 9, we provide a mounting bar 24 which is mounted within the slot 13. Screws 25 extend through the bar 24 and into the wall 23 for connecting the bracket 19 with said bar. The opening 14 is provided in the guide channel 12 for permitting selective insertion of the screws 25 through the guide bar and into said bottom wall 23 of the said bracket 19. It will now be understood that the foot plate is mounted for sliding movement on the top wall 3 of the body throughout the length of the slot 9.

Connected with the foot plate element 16 is a pointer 26 which cooperates with the scale 11 for indicating the length, or height, of a child lying on the device.

There will now be described the clamping mechanism which is mounted on the bracket 19 and which serves the purpose of clamping the foot plate in a desired adjusted position. This clamping mechanism, as best seen in Figures 4 and 8 through 11 of the drawings, includes a clamping pin 27 which is slidably mounted through the bottom wall 23 and the guide bar 24. The lower end of the clamping pin normally contacts the upper surface of the guide slot 13. Carried on the pin near its upper end is a stop shoulder 28 which limits downward movement of the pin and defines an upper end portion 29 for said pin.

A portion of one of the walls 22 of the bracket 19 is stamped and pressed inwardly to define a stop plate 30, and extending between the stop plate and the shoulder 28 is a coiled spring 31, said coiled spring having its lower end portion surrounding the upper end portion 29 of the pin. The purpose of the spring is, of course, to retain the pin 27 normally in lowermost latched position.

In order to raise the pin 27 for permitting free sliding movement of the foot plate in the slot 9, we provide a release lever 32. Said release lever is formed with a body 33 which extends obliquely upwardly between the walls of the brackets 19. At its lower end the lever is formed with an integral lifting plate 34 which is bifurcated at 35 to receive the mid-portion of the pin 27. The lever 32 includes, at its upper end, a laterally directed lug 36 which is maintained in constant contact with the inner flange 37 of a push button 38 by means of the spring 31, the push button 38 being mounted in one of the walls 22 substantially medially of its height and in spaced relation above the stop plate 30. It will now be understood that, when the push button 38 is pressed inwardly, the lever 32 will lift the clamping pin 27 from the surface 13 with the result that the foot plate may be shifted as desired along the length of the slot 9. When pressure is released on the push button 38, the spring 31 will force the pin 27 into engagement with the upper surface of the slot 13 for anchoring said foot plate in a desired adjusted position.

As best seen in Figures 1 and 2 of the drawings, the top wall 3 of the body 1 is provided with a head plate 39 which is substantially arcuate in contour and which is rigidly supported in position by means of brackets 40. Between the head plate 39 and the end wall 4 of the body, there is mounted a weight scale 41 which is, of course, graduated in pounds and ounces and is associated with conventional scale mechanism 42 which is mounted within the body and includes a plate 43 movable with respect to the top wall 3. In this connection it is desired to state that the scale mechanism forms no part of our invention other than in the combination. It is, therefore, obvious that any suitable type of scale mechanism may be employed, as desired.

The body 1 of our improved combination scale and measuring table is closed at its bottom by a bottom wall 44 which is upwardly offset at its side edges to define leg receiving compartments 45 and 46, said compartments also being defined by the corresponding lower end portions of the side walls 6 and 7. As will be seen in Figures 2 and 3, the compartments 45 and 46 extend throughout the major portion of the length of the body at each side thereof.

Mounted in each of the compartments are legs 47 and 48, corresponding legs 47 being mounted at corresponding ends of said compartments and corresponding legs 48 being mounted in corresponding opposite ends of said compartments. Inasmuch as the mounting of each of the legs is identical, it is thought that the description of the mounting of the leg 48 in Figure 3 will suffice for all. In this connection reference is had more particularly to Figures 12, 13 and 14 of the drawings wherein the particular leg mounting structure is shown in detail. The leg 48 includes a hinge member 49 which is of substantially semi-circular shape and which mates with a hinge member 50 which is welded or otherwise suitably secured within the compartment 46 at one end thereof. A hinge pin 51 extends through the hinge members 49 and 50 and provides the hinge connection. As best seen in Figures 13 and 14, the hinge member 50 is formed with recesses or notches 52 and 53, said recess 52 being presented horizontally and said recess 53 being presented downwardly. The leg 48 is formed with a socket 54 which communicates with the inner end of said leg and confronts the hinge member 50. Slidably mounted within the socket 54 is a plunger 55 and normally urging said plunger outwardly from the socket is a spring 56. The plunger 55 is formed with a tooth 57 which is selectively engageable in the notches 52 and 53. It will now be understood that, when the leg 48 is swung upwardly to lie within the compartment 46, the tooth 57 of the plunger 55 will be engaged in the notch 52 for releasably retaining said leg in said folded position. When the leg is swung downwardly to the position shown in Figure 14, the tooth of the plunger 55 will engage in the notch 53 for releasably holding the leg in extended position. In this connection it is desired to state that the legs comprise telescoping sections so that their lengths may be varied.

Mounted on the upper, or inner, end of the leg 48 and on the outer face of said leg is a rubber pad or foot 58 which will, when the legs are folded, serve as a foot for the device. Each of the legs is, of course, provided with these pads or feet with the result that the device may be placed on any surface without damaging said surface.

Although it is believed that the operation of the invention will be clear to persons versed in the art after a reading of the foregoing description, a brief discussion on the subject is not thought to be out of order.

As stated, the device may be transported readily from place to place. If desired, a suitable carrying case may be manufactured for the purpose. When it is desired to place the device in use, it is only necessary to place the same on a supporting surface and to place the child to be weighed and measured on the top wall of the frame or body. The child's head is placed against the head plate 39 and the foot plate is then shifted along the slot 9 until the foot plate element 16 contacts the soles of the child's feet. The length, or height, of the child may be then read from the scale 11. At the same time, the physician or other person may learn the child's weight by merely glancing at the scale 41. As stated, the scale mechanism may be of any suitable embodiment so that a further description theerof is deemed unnecessary.

It is desired to call attention to the fact that, by the use of our device, it will be possible to weigh a child and, at the same time, to measure him. Separate weighing and measuring operations are, therefore, not necessary, with the result that a material amount of time will be saved.

Having thus described the invention, what is claimed as new is:

1. A device of the class described including a body having a top wall formed with a slot, a recess on the top wall, a scale in the recess, a foot plate including a foot plate element and a mounting bracket for said element, said mounting bracket having its lower end slidable in the slot, a pointer carried by the foot plate element and cooperating with the scale for indicating the length of an infant lying on the top wall, means carried by the bracket for latching the foot plate in an adjusted position in the slot, said means including a clamping pin, a spring normally urging the clamping pin to clamping position, a release lever, and a push button engageable with the release lever for shifting said lever and raising the clamping pin.

2. A device of the class described including a body having a top wall formed with a slot, a guide channel carried by the top wall and extending beneath the slot, said guide channel having a guide slot, a head plate carried by the top wall, a foot plate carried by said top wall and having a foot plate element and a mounting bracket for said element, said mounting bracket having its lower end extending into the slot, a guide bar slidably mounted in the slot and connected with the lower end of the mounting bracket for slidably connecting the foot plate with the first-mentioned slot, a pointer carried by the foot plate element, and a scale cooperating for measuring the length of an infant lying on the body.

3. A device of the class described as recited in claim 2 including means on the mounting bracket for clamping said foot plate and guide bar in an adjusted position in the first-mentioned slot.

4. A device of the class described as recited in claim 2 including means on the mounting bracket for claimping said foot plate and guide bar in an adjusted position in the first-mentioned slot, said means including a clamping pin, a spring normally urging the clamping pin to contact the upper surface of the guide slot, a release lever connected with the clamping pin, and a push button carried by the mounting bracket and engageable with the release lever.

THADDEUS B. OOT.
RAYMOND V. GREEN.